United States Patent

Ota

(10) Patent No.: US 6,714,304 B2
(45) Date of Patent: Mar. 30, 2004

(54) FOURIER TRANSFORMATION INFRARED SPECTROPHOTOMETER

(75) Inventor: Hiroshi Ota, Uji (JP)

(73) Assignee: Shimadzu Corporation, Kyoto (JP)

( * ) Notice: Subject to any disclaimer, the term of this patent is extended or adjusted under 35 U.S.C. 154(b) by 37 days.

(21) Appl. No.: 10/187,893

(22) Filed: Jul. 3, 2002

(65) Prior Publication Data

US 2003/0007155 A1 Jan. 9, 2003

(30) Foreign Application Priority Data

Jul. 4, 2001 (JP) ....................................... 2001-202935

(51) Int. Cl.[7] ................................................. G01B 9/02
(52) U.S. Cl. ........................ 356/451; 356/486; 356/489; 356/604
(58) Field of Search ................................. 356/451, 486, 356/489, 604

(56) References Cited

U.S. PATENT DOCUMENTS

| | | | | |
|---|---|---|---|---|
| 4,766,551 A | * | 8/1988 | Begley | |
| 5,519,491 A | * | 5/1996 | Gaechter | |
| 5,715,056 A | * | 2/1998 | Urabe et al. | |
| 5,757,488 A | * | 5/1998 | Melton et al. | |
| 6,552,678 B1 | * | 4/2003 | Adragna | |

* cited by examiner

Primary Examiner—Frank G. Font
Assistant Examiner—Khaled Brown
(74) Attorney, Agent, or Firm—Westerman, Hattori, Daniels & Adrian, LLP

(57) ABSTRACT

A method of obtaining a spectrum in a Fourier transformation infrared spectrophotometer includes the following steps: sampling a set of data while a movable mirror of the Fourier transformation infrared spectrophotometer performs a reciprocal movement, wherein the set of data constitutes an interferogram; judging whether the interferogram is reliable or not by comparing the shape of the interferogram with a shape of another interferogram or shapes of other interferograms obtained through neighboring measurement of measurements; accumulating the data of interferograms that are judged to be reliable; and constituting an absorption spectrum using a Fourier transformation method based on the accumulated data. Since unreliable data are adequately avoided from the data accumulation, the reliability of the accumulated data is assured, and an accurate absorption spectrum can be obtained. Thus, even when a mechanical disturbance or an electrical shock affects the measurement instantaneously, there is no need to repeat the measurement, and the absorption spectrum obtained after the measurement is still reliable. This is especially useful when the sample does not allow a second measurement.

10 Claims, 4 Drawing Sheets

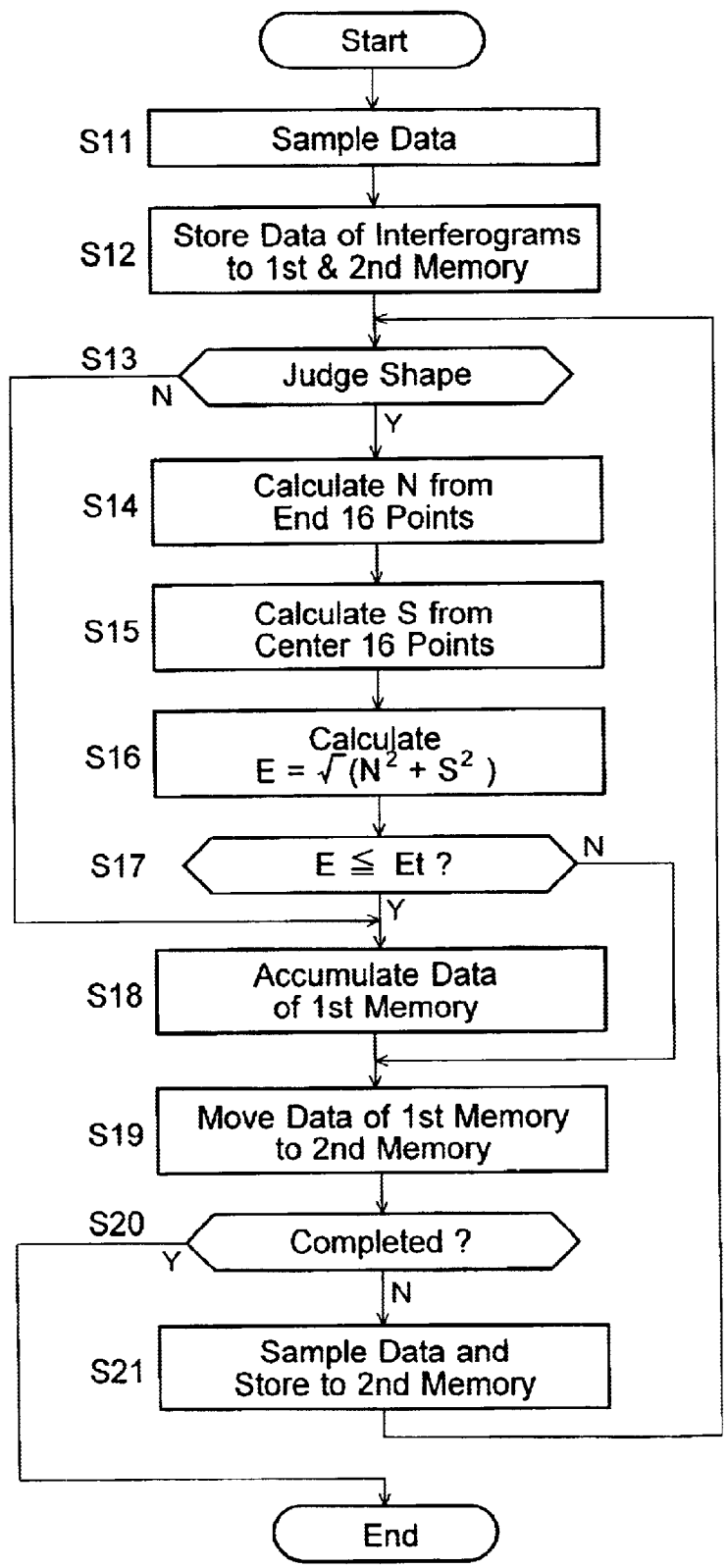

FOURIER TRANSFORMATION INFRARED SPECTROPHOTOMETER

The present invention relates to a Fourier transformation infrared spectrophotometer.

BACKGROUND OF THE INVENTION

In a Fourier transformation infrared spectrophotometer (which is hereinafter referred to as an FTIR), a fixed mirror and a movable mirror constitute a Michaelson Interferometer, which generates an interference wave whose amplitude changes with time. A sample is irradiated with the interference wave, and the transmitted light or the reflected light is detected as an interferogram. The detected interferogram is Fourier transformed and an absorption spectrum is constructed with the wavenumber as an abscissa and the strength (the transmittance or the absorbance) as an ordinate.

In an FTIR, an absorption spectrum over an entire range of preset wavelengths can be obtained with a single reciprocal movement of the movable mirror. Since the S/N ratio is low with such a single movement, in general, the movable mirror is moved reciprocally several times and the data of the interferograms are accumulated. Then the accumulated data is Fourier transformed to generate an absorption spectrum with a high S/N ratio.

In the following cases, however, an error may occur in the interferogram of an FTIR.

(1) Just after the light source is turned on, the temperature of the light source is still changing and the strength of the light is not yet stable.

(2) Just after a sample is set in a sample chamber, the output of the detector (pyroelectric detector, for example) is not yet stable.

(3) When a strong shock is given to the apparatus, the movement of the interferometer is influenced by the shock.

(4) When an electrical noise intrudes the electrical circuit, a corresponding noise appears in the interferogram.

Since, in conventional FTIRs, data of the interferograms are accumulated irrespective of the quality of the interferograms, so that the final accumulated wave data is highly probably tainted. This causes (a) noises are superimposed on the absorption spectrum, (b) the baseline shifts, or in some cases (c) a peak is deformed in the differentiated form. In these cases, the measurement should be repeated, or one should wait for the measurement until the apparatus becomes stable. Especially in the case of an FTIR, a measurement requires a rather long time because the Fourier transformation takes a long time. Thus in the case of an FTIR, repetitive measurements greatly lowers the measurement efficiency. Under certain circumstances, the sample does not allow a repetition of the measurement.

The present invention addresses the problem, and one of the objects is to provide an FTIR in which deformation of the interferograms or intrusion of noise in them is adequately avoided, and a reliable absorption spectrum can be obtained.

SUMMARY OF THE INVENTION

According to the present invention, a method of obtaining a spectrum in a Fourier transformation infrared spectrophotometer includes the following steps:

sampling a set of data while a movable mirror of the Fourier transformation infrared spectrophotometer performs a reciprocal movement, wherein the set of data constitutes an interferogram;

judging whether the interferogram is reliable or not by comparing the shape of the interferogram with a shape of another interferogram or shapes of other interferograms obtained through neighboring measurement of measurements;

accumulating the data of interferograms that are judged to be reliable; and constituting an absorption spectrum using a Fourier transformation method based on the accumulated data.

In other words, a Fourier transformation infrared spectrophotometer according to the present invention includes:

judging means for judging whether a first interferogram obtained through a first measurement is reliable or not by comparing the shape of the first interferogram with a shape of another interferogram or shapes of other interferograms obtained through neighboring measurement or measurements;

accumulating means for accumulating data of interferograms that are judged to be reliable by the shape judging means; and spectrum constituting means for constituting an absorption spectrum using a Fourier transformation method based on the data accumulated by the accumulating means.

In the FTIR of the present invention, all the data of interferograms sampled through measurements are not accumulated, but only data of such interferograms whose shapes are judged to be reliable are accumulated. Data of interferograms that are judged to be unreliable are not included in the accumulation.

In one aspect of the present invention, the shape of an interferogram is judged to be reliable when the noise level of the interferograms is larger than the threshold value. In another aspect of the present invention, the shape of an interferogram is judged to be reliable when a dissimilarity value among the interferograms is larger than the threshold value. Of course, both the noise level and the dissimilarity value may be used in the judgment. Various specific methods of the judgment are described in the description of a preferred embodiment that follows.

Preferably, the judging means compares two consecutively sampled interferograms. In this case, shapes of the chronologically closest interferograms are compared, so that stabler judgment can be made. This is especially useful for judging the stability of the light source or of the detector which becomes stabler as time passes.

Since, in the FTIR of the present invention, unreliable data are adequately avoided from the data accumulation, the reliability of the accumulated data is assured, and an accurate absorption spectrum can be obtained. Thus, even when a mechanical disturbance or an electrical shock affects the measurement instantaneously, there is no need to repeat the measurement, and the absorption spectrum obtained after the measurement is still reliable. This is especially useful when the sample does not allow a second measurement.

The following measurement is possible in the present invention. When an unstable sample whose absorption spectrum changes as time is measured, data accumulation is not performed while the interferograms are judged unreliable, and data accumulation is performed after the sample becomes stable. Thus the absorption spectrum obtained from the FTIR of the present invention assures and reflects the state of the stable sample. Similarly, while the humidity or content of the carbon dioxide in the sample cell or sample chamber is unstable, the sampled data is not included in constituting the absorption spectrum. This allows an automated measurement in which a proper measurement automatically starts when the purge of vapor or carbon dioxide from the sample cell is adequately completed.

BRIEF DESCRIPTION OF THE DRAWINGS

FIG. 5 is a flowchart of the operation of the FTIR for accumulating interferograms in normal operations.

DETAIL DESCRIPTION OF A PREFERRED EMBODIMENT

Figure 1:
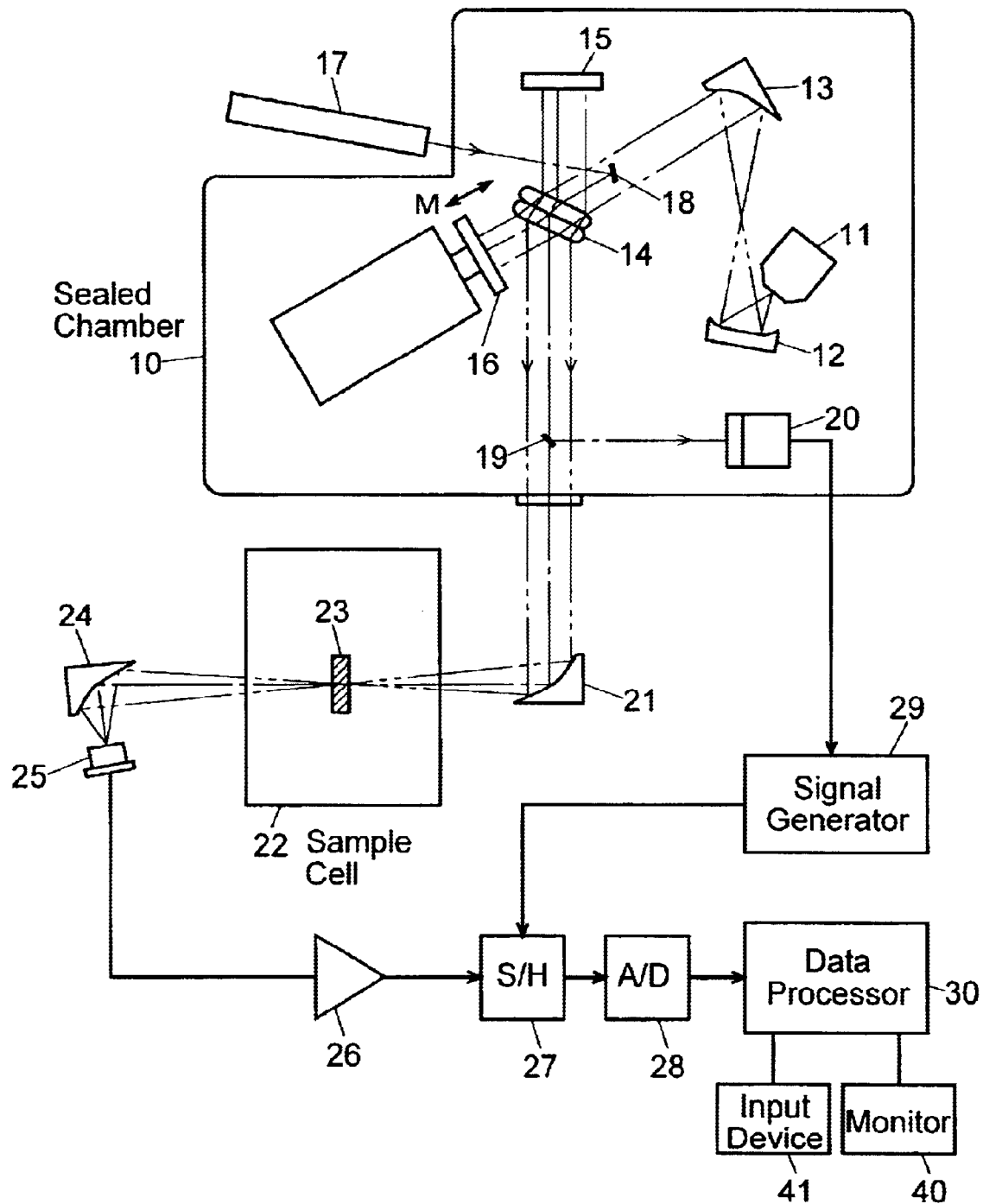
FIG. 1 is a schematic diagram of an FTIR embodying the present invention.

As shown in FIG. 1, the main interferometer is composed of an infrared light source 11, a converging mirror 12, a collimator mirror 13, a beam splitter 14, a fixed mirror 15, a movable mirror 16, etc. With these components, the main interferometer generates an interference infrared light to be used for a spectrum measurement, as follows. The infrared light emitted from the infrared light source 11 is reflected by the converging mirror 12 and then by the collimator mirror 13, and is cast onto the beam splitter 14, which divides the infrared light in two ways. One light is directed to the fixed mirror 15 and the other light is directed to the movable mirror 16. The lights are reflected by the fixed mirror 15 and the movable mirror 16 respectively and are reunited at the beam splitter. The reunited light is directed to the parabolic mirror 21. Since, in the meantime, the movable mirror 16 is moving reciprocally against the light (as shown by M in FIG. 1), the amplitude of the reunited light changes with time, which is called an "interferogram." The interferogram is converged by the parabolic mirror 21, and sent to the sample cell 22. The interferogram passes through the sample 23 in the sample cell 22, and then is again converged by the elliptic mirror 24 toward the infrared light detector 25.

The control interferometer, on the other hand, is composed of a laser light source 17, a laser mirror 18, the beam splitter 14, the fixed mirror 15, the movable mirror 16, etc, where the beam splitter 14, the fixed mirror 15 and the movable mirror 16 are commonly used with the main interferometer. The control interferometer generates a laser interference light for producing an interference fringe signal, as follows. The laser light emitted from the laser light source 17 is reflected by the laser mirror 18 and cast onto the beam splitter 14. Similarly to the above, the laser light is once divided and reunited to produce an laser interference light, which is directed to the parabolic mirror 21. The cross diameter of the laser interference light is set very small so that the laser interference light is reflected by a small mirror 19 placed in the optical path and introduced to a laser light detector 20.

These optical components mentioned above are all placed in a sealed chamber 10 in which the humidity is controlled in order mainly to protect the beam splitter from moisture because it is normally made of KBr which is deliquescent.

The laser light detector 20 generates a detection signal bearing the information of the laser interference light, which is called a "laser interference fringe signal." The laser interference fringe signal is sent to the signal generator 29, which produces pulse signals to be used for sampling the detection signal of the interferogram. The laser interference fringe signal is also used to control the stable movement of the movable mirror 16. The signal generated by the infrared detector 25 is amplified by the amplifier 26, and is sampled in the sample hold (S/H) circuit 27 at the timing of the above-mentioned pulse signals. The sampled signal is converted to digital data by the a/d converter 28, and the data is sent to the data processor 30. In the data processor 30, the data is processed as explained later for the Fourier transformation, and an absorption spectrum is generated.

The data processor 30 may be constructed as a dedicated processor, but normally a personal computer with an appropriate processing program is used for it. A monitor 40, and an input device 41, which normally includes a keyboard and a pointing device such as a mouse, are connected to the data processor 30.

Figure 2:
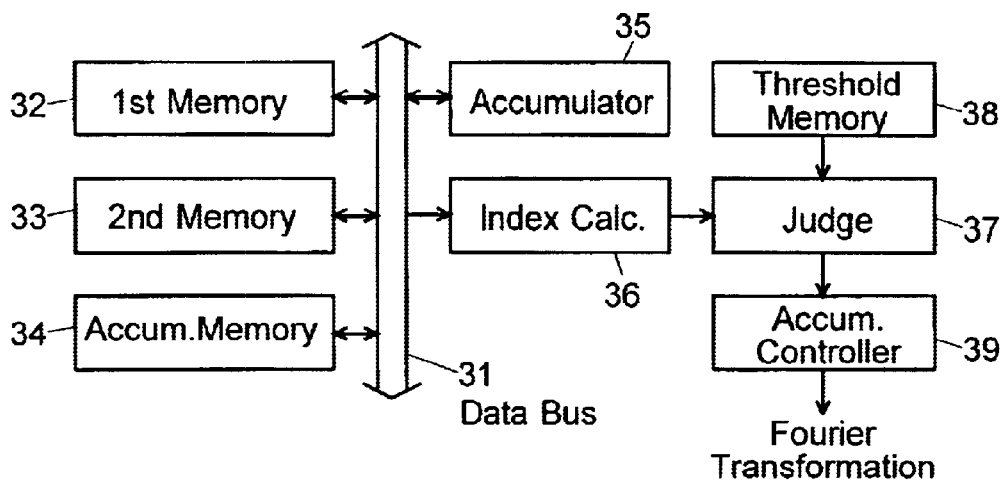
FIG. 2 is a functional block diagram of the data processing section of the FTIR.

The data processor 30 is functionally constructed as shown in FIG. 2. A data bus 31 is provided in the data processor 30, which is connected to the output of the a/d converter 28. The first memory 32, the second memory 33, the accumulation memory 34, the accumulator 35 and the index calculator 36 are connected to the data bus 31. The index calculator 36 generates an index, which is given to the index comparator 37. The index comparator 37 compares the value of the index with a threshold value stored in the threshold memory 38, and the result is sent to the accumulation controller 39. The accumulation controller 39 controls the accumulating operation in the data processor 30 by controlling the reading/writing of data at every memory and the traffic of data through the data bus 31.

The first memory 32, the second memory 33 and the accumulation memory 34 have a large enough capacity to store, respectively, the data of an interference wave sampled in a measurement with a complete reciprocal movement of the movable mirror 16. For example, an interference wave is composed of 1,000–10,000 samples in a measurement corresponding to a complete reciprocal movement of the movable mirror 16. It is of course possible for the memories 32, 33, 34, 38 to share a physical storage space.

In the FTIR, the threshold value must be predetermined and stored in the threshold memory 38. In the FTIR of the present embodiment, a button (which may be a real button or a functional button) is provided for starting a threshold measurement mode, whereby a series of measurements are automatically performed and a new threshold value is created or updated, and stored in the threshold memory 38.

Figure 3A:
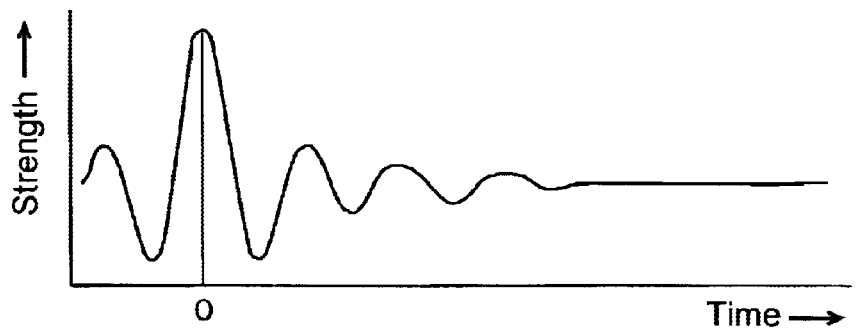
FIGS. 3A and 3B show an example of an interferogram and the sampled data.
Figure 3B:
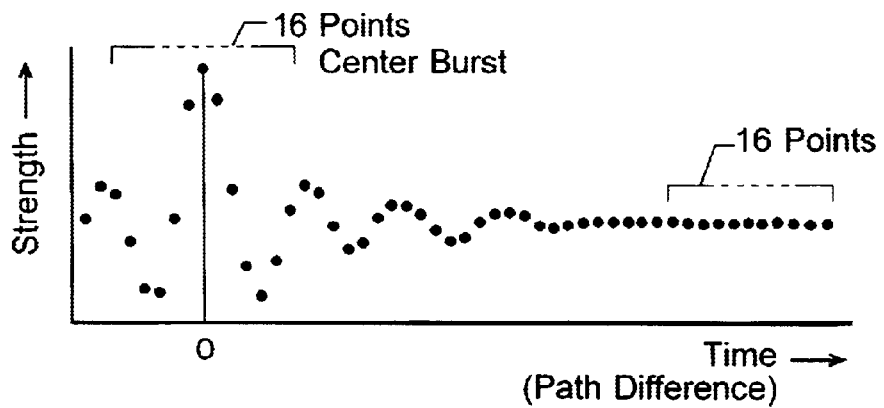
Figure 4:
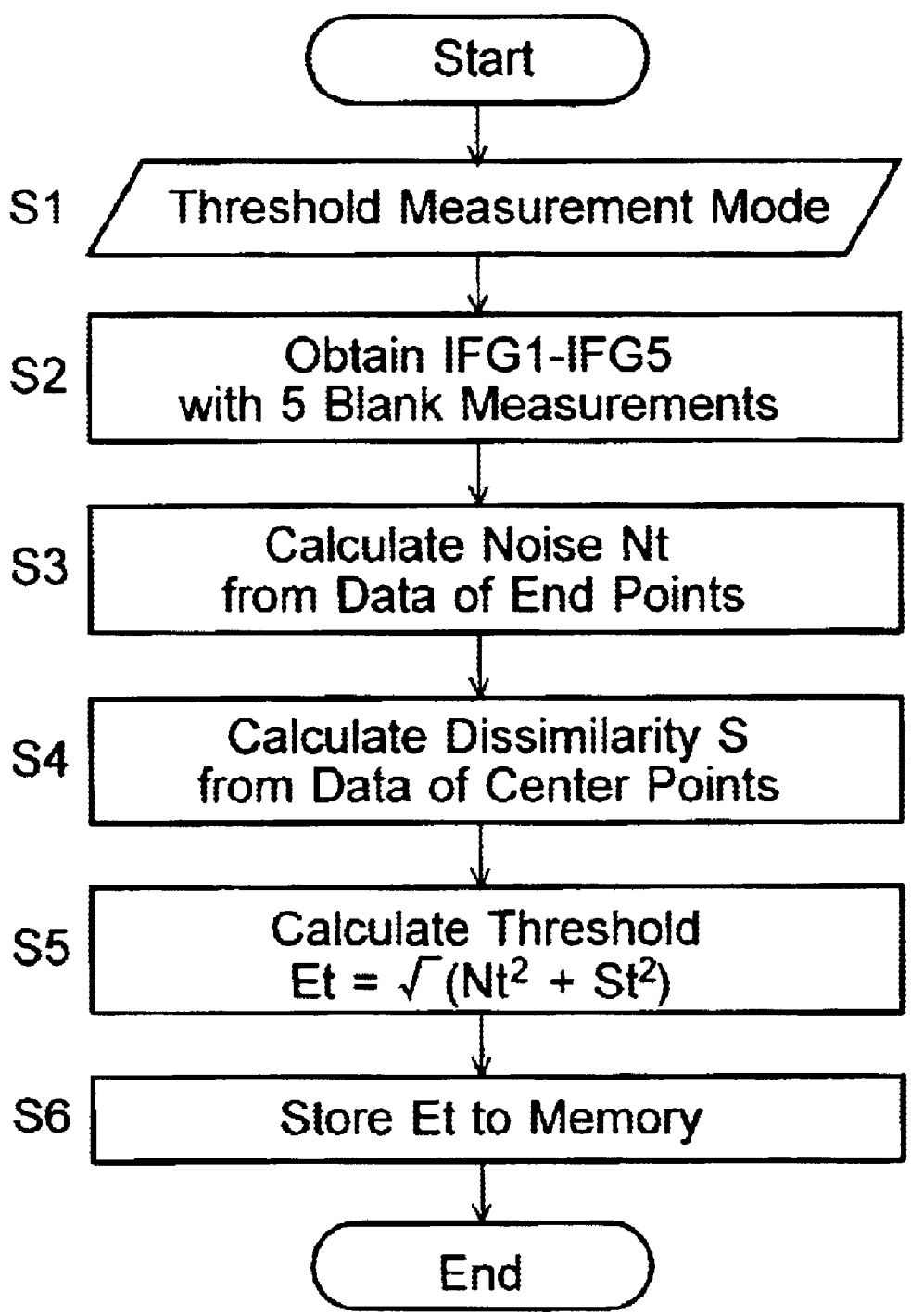
FIG. 4 is a flowchart of the operation of the FTIR in the threshold measurement mode.

The threshold measurement mode is described referring to the flowchart of FIG. 4. After the infrared light source 11 is turned on, the operator waits until the strength of the light from the light source 11 becomes adequately stable and the output of the infrared detector 25 becomes also adequately stable. When they are assumed to be adequately stable, the operator pushes (or clicks) the threshold measurement mode button on the input device 40 without putting a sample in the sample cell 22 (which is called a blank measurement) (Step S1). Responsive to the button operation, the controller starts a threshold measurement mode, in which five measurements are consecutively performed, and the data of five interferograms are sampled. The five interferograms are referred to as IFG1–IFG5 (Step S2). An example of an interferogram is shown in FIG. 3a, and the sampled data are shown in FIG. 3b.

Using the data of five interferograms IFG1–IFG5, an average noise level Nt is calculated (Step S3). A noise level N is an index of the level of noise included in an interferogram. In order to calculate the noise level every time on the same region, the data of 16 points in an end (see FIG. 3B) of an interferogram, whose minimum resolution is 16 cm$^{-1}$, are taken. The average of the data of all points is calculated, and the difference between the data of every point and the average data is regarded as noise of the point. The root mean square (RMS) value of the noise of the 16 points of the five interferograms is calculated as the average noise level Nt.

Using the data of the five interferograms IFG1–IFG5, the value of an average dissimilarity St is calculated (Step S4). A dissimilarity S is an index representing a change in the shape of interferogram, and is calculated between two chronologically adjacent interferograms. The value of S is smaller as the difference in the shape of two adjacent interferograms is smaller, or as the two interferograms are similar. In the present case, the data of 16 points at the center (center burst, see FIG. 3B) of an interferogram are used for calculating the value of S, because the data around there most greatly affect the shape of the absorption spectrum. Thus a difference between the data of a point in the 16 points of an interferogram and that of the same point in the adjacent interferogram is calculated, and the root mean square (RMS) value of the differences of 16 points of the two adjacent interferograms is calculated. Since there are five interferograms, four such RMS values (between two adjacent interferograms) are calculable. The average of the four RMS values is calculated as the average dissimilarity St.

After calculating the values of Nt and St, the threshold value Et is calculated as follows (Step S5).

$$Et=\sqrt{(Nt^2+St^2)}$$

Because it is preferable for both the noise N and the dissimilarity S to be smaller, it is generally considered that the smaller threshold value Et is, the better the shape of the interferogram is. The threshold value Et is stored in the threshold memory 38 (Step S6).

As explained later, the threshold value Et is important in judging whether the shape of an interferogram taken in a sample measurement is reliable or not. The noise level N or the dissimilarity value S is influenced by the condition of the apparatus, and also by a chronic change of the apparatus. Thus it is constructed so that the threshold value is updatable anytime the operator thinks necessary.

Next, the normal operation of the FTIR of the present embodiment is described referring to the flowchart of FIG. 5. Before beginning a measurement, the operator determines on the input device 40 whether a trimming operation should be performed or not. When the operator determines here that no trimming operation is performed, all the successively observed interferograms, including irregular interferograms, will be accumulated and the data of the accumulated interferograms will be produced, as in the conventional method.

When a measurement is started, the movable mirror 16 is moved reciprocally with a preset cycle time, and an interferogram is generated in one reciprocal movement of the movable mirror 16 (Step S11). Under the control of the accumulating controller 39, the data of the interferogram obtained in the first measurement is transmitted through the data bus 31 and stored in the first memory 32. The data of the next interferogram obtained in the second measurement is stored in the second memory 33 (Step S12).

When the operator determines that a trimming operation should be performed (Y at Step S13), after the interferogram data is stored in the second memory 33, the shape of the interferogram of the first measurement stored in the first memory 32 is examined. That is, data from the first memory 32 and data from the second memory 33 are respectively read out and sent to the index calculator 36. In the index calculator 36, the average value of data of 16 points in an end of every interferogram is calculated, and a noise value at every point is calculated by subtracting the data of every point from the average value. The noise level N is calculated by the average of the RMS of the noise values (Step S14).

Then the difference of the data of the two interferograms at every point belonging to the 16 points of the center burst is calculated, and the dissimilarity S of the two interferograms is calculated as the RMS value of the 16 differences (Step S15).

After calculating the values of N and S, the index value E is calculated as follows (Step S16).

$$E=\sqrt{(N^2+S^2)}$$

As explained before, the smaller value of E means a better form of the interferogram.

The index value E is sent to the index comparator 37, where the index value E is compared with the threshold value Et stored in the threshold memory 38 (Step S17). When the index value E is smaller than or equal to the threshold value Et, the shape of the interferogram is judged to be reliable. When the accumulating controller 39 receives the reliable judgment of the interferogram, it sends the accumulated waveform data read out from the accumulation memory 34 and the data of the interferogram read out from the first memory 32 to the accumulating processor 35. In the accumulating processor 35, the two data are added at every point, and the sums of the data are stored in the accumulation memory 34. Then the data of the interferogram in the second memory 33 is moved to the first memory 32, whereby the second memory 33 is ready to admit the data that will be sampled in the next measurement (Step S19).

When the index value E is determined to be larger than the threshold value Et in the index comparator 37, the shape of the interferogram is judged to be unreliable and thus ineligible for the accumulation. In this case, the accumulating process of Step S18 is skipped, and the data move from the second memory 33 to the first memory 31 is performed (Step S19).

After a predetermined time of measurements is performed, it is determined whether measurements in preset conditions are completed (Step S20). If they are not completed, the next measurement is performed to sample and store the data of another interferogram in the second memory 33 (Step S21), and the process returns to Step S13. If the predetermined measurements are completed at Step S20, the Fourier transformation calculation is then performed using the accumulation data stored in the accumulation memory 34. When the trimming operation is not selected, the process jumps from Step S13 to Step S18, so that the accumulation is performed unconditionally.

The change in the state of the index value E according to various error factors is discussed.

(1) When the temperature of the infrared light source 11 is still changing (rising) and the strength of the infrared light is unstable, the interferogram chronologically changes its shape especially around the center burst. In this case, the value of dissimilarity S is large, and the index value E is also large so that the shape of the interferogram is likely to be judged unreliable.

(2) When the output of the infrared detector 25 is still unstable, as in the case just after a measurement begins, the interferogram changes its shape conspicuously around the center burst. In this case, the index value F is large so that the shape of the interferogram is also likely to be judged as unreliable.

(3) When the operation of the interferometer is disturbed by, for example, an externally given shock, noises intrude in the interferogram, and the value of N increases. In some cases, the dissimilarity S increases. This increases the index value E and it is likely that the shape of the interferogram is judged unreliable.

(4) When electrical noises intrude in the electrical system of the apparatus, corresponding noises intrude in the interferogram and the noise level N increases. In some cases, the dissimilarity S increases. Thus the index value E increases and the shape of the interferogram is likely to be judged unreliable.

In summary, using the two parameters E and S, unreliable interferograms are surely detected and avoided from the accumulation, so that the accuracy of the absorption spectrum after the Fourier transformation is enhanced.

What is claimed is:

1. A Fourier transformation infrared spectrophotometer comprising:

judging means for judging whether a first interferogram obtained through a first measurement is reliable or not by comparing the shape of the first interferogram with a shape of another interferogram or shapes of other interferograms obtained through neighboring measurement or measurements;

accumulating means for accumulating data of interferograms that are judged to be reliable by the shape judging means; and spectrum constituting means for constituting an absorption spectrum using a Fourier transformation method based on the data accumulated by the accumulating means.

2. The Fourier transformation infrared spectrophotometer according to claim 1, wherein the judging means judges that the interferogram is reliable when a noise level of the interferograms is larger than a threshold value.

3. The Fourier transformation infrared spectrophotometer according to claim 2, wherein the noise level of the interferograms is calculated from data of points in a predetermined end of the interferograms.

4. The Fourier transformation infrared spectrophotometer according to claim 1, wherein the judging means judges that the interferogram is reliable when a dissimilarity value among the interferograms is larger than a threshold value.

5. The Fourier transformation infrared spectrophotometer according to claim 4, wherein the dissimilarity value is calculated from data of points in a predetermined center burst of the interferograms.

6. A method of obtaining a spectrum in a Fourier transformation infrared spectrophotometer comprising steps of:

sampling a set of data while a movable mirror of the Fourier transformation infrared spectrophotometer performs a reciprocal movement, wherein the set of data constitutes an interferogram;

judging whether the interferogram is reliable or not by comparing the shape of the interferogram with a shape of another interferogram or shapes of other interferograms obtained through neighboring measurement of measurements;

accumulating the data of interferograms that are judged to be reliable; and constituting an absorption spectrum using a Fourier transformation method based on the accumulated data.

7. The Fourier transformation infrared spectrophotometer according to claim 6, wherein the interferogram is judged to be reliable when a noise level of the interferograms is larger than a threshold value.

8. The Fourier transformation infrared spectrophotometer according to claim 7, wherein the noise level of the interferograms is calculated from data of points in a predetermined end of the interferograms.

9. The Fourier transformation infrared spectrophotometer according to claim 6, wherein the interferogram is judged to be reliable when a dissimilarity value among the interferograms is larger than a threshold value.

10. The Fourier transformation infrared spectrophotometer according to claim 9, wherein the dissimilarity value is calculated from data of points in a predetermined center burst of the interferograms.

* * * * *